United States Patent [19]

Kessler

[11] Patent Number: 4,827,765
[45] Date of Patent: May 9, 1989

[54] MOTOR DRIVEN SPINNER FLOW METER

[75] Inventor: Galvin W. Kessler, Houston, Tex.

[73] Assignee: Halliburton Logging Services, Inc., Houston, Tex.

[21] Appl. No.: 163,502

[22] Filed: Mar. 3, 1988

[51] Int. Cl.⁴ ............................................. E21B 47/10
[52] U.S. Cl. ..................................................... 73/155
[58] Field of Search ...................... 73/155, 151, 861.36, 73/861.83, 861.89

[56] References Cited

U.S. PATENT DOCUMENTS

| | | | |
|---|---|---|---|
| 1,550,124 | 8/1925 | Thompson | 73/861.77 |
| 2,652,720 | 9/1953 | Piety | 73/155 |
| 4,332,173 | 6/1982 | MacManus | 73/861.89 |
| 4,345,480 | 8/1982 | Basham et al. | 73/861.83 |
| 4,537,081 | 8/1985 | Max | 73/861.77 |
| 4,581,926 | 4/1986 | Moore et al. | 73/155 |

FOREIGN PATENT DOCUMENTS 1257181  9/1986  U.S.S.R. ................................. 73/155
1270311 11/1986  U.S.S.R. ................................. 73/155

Primary Examiner—Stewart J. Levy
Assistant Examiner—Kevin D. O'Shea
Attorney, Agent, or Firm—William J. Beard

[57] ABSTRACT

The present disclosure is directed to a motor driven magnetically clutch connected turbine on a sonde adapted to be lowered in a well borehole for measuring fluid flow velocity in the well. The turbine is sourounded by a perforated cage or housing which permits fluid flow to impinge on the turbine and thereby change the speed of rotation of the turbine. The turbine is driven at a first speed dependent on magnetic clutch connection from the turbine to a motor. The turbine speed is changed depending on fluid flow velocity in the well, and such changes are reflected in changes in operating conditions of the motor which powers the turbine at the first speed. Measurement of such changes yields fluid flow velocity.

10 Claims, 2 Drawing Sheets

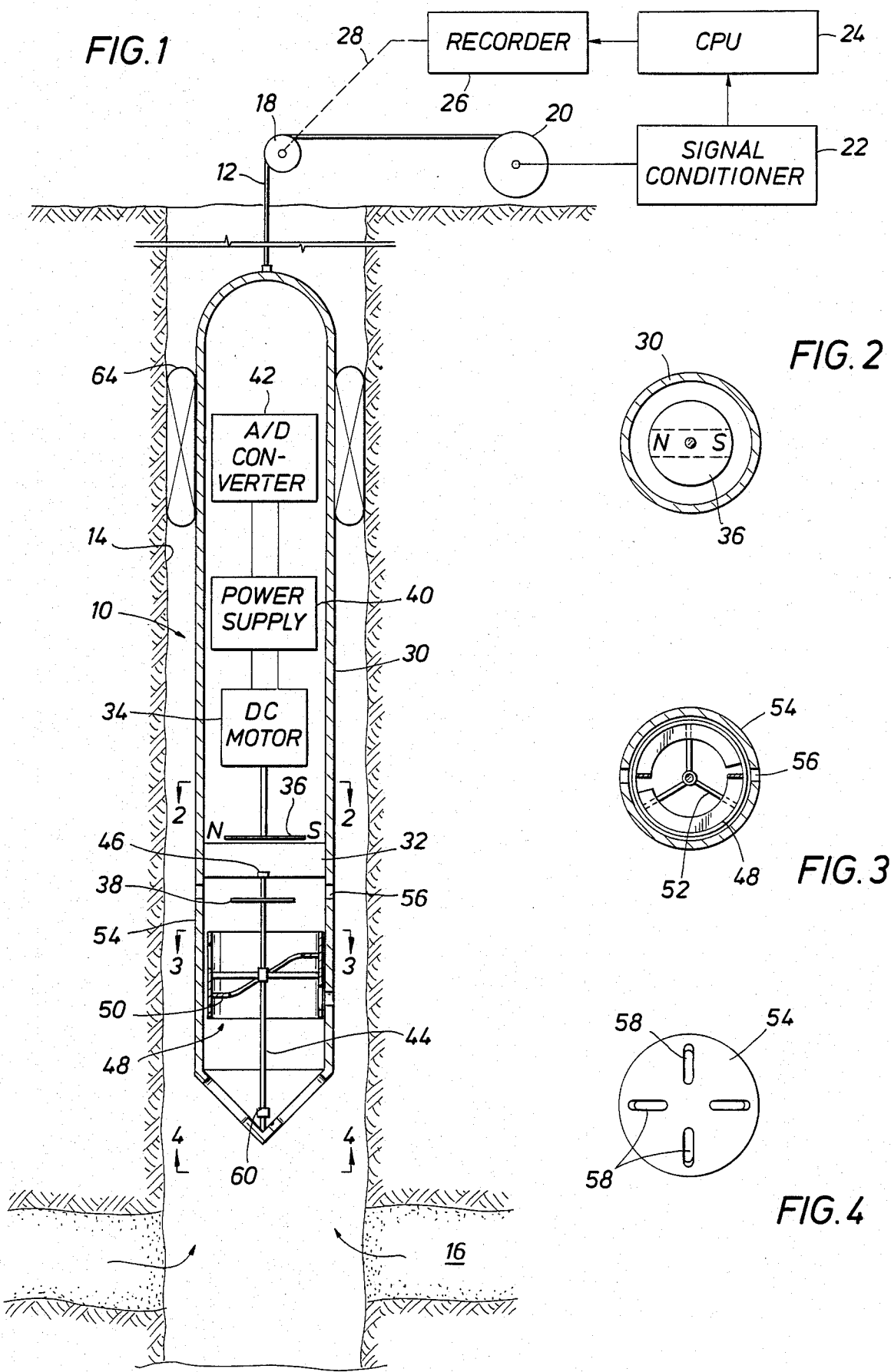

MOTOR DRIVEN SPINNER FLOW METER

BACKGROUND OF THE DISCLOSURE

It is sometimes necessary to measure fluid flow velocity in a well during drilling or at various completion stages. The fluid flow rate which is flowing in the well can not be simply measured discharge at the well head to thereby obtain the velocity of fluid along the well. That is the most simple of situations and prevails only if there is a single outlet from the well receiving fluid from a single inlet (typically, a producing formation) into the well. This possibility can never be known for sure if the well penetrates multiple zones where several zones might contribute to the fluid flow. As one example, a single well may pass through two separate zones which produce at different flow rates. The flow from the well head is not indicative of production from the indivdual zones. Rather total flow is equal to the sum of the two production flow rates.

A further complicating factor is the possibility that one of the zones may be a thief zone. That is, it will rob the well of fluid produced from other zones. This makes production measurements important and in particular, it necessitates accurate measurements of flow velocity at various depths in the well. For instance, it is possible to isolate a particular zone by measuring the flow rate above and below that zone so that the contribution of the particular zone be determined. Another problem which arises is that flow rates do eventually decrease towards zero and low production rates are much more difficult to measure. When the flow rate is low, nonlinear drag factors in the operation of the flow velocity measuring devices become critical. In the past, flow meters utilizing spinners have been irregular in threshold values which in typical circumstances can provide an erroneous reading of as much as 100 barrels per day. In other words, such spinners have linear ranges of operation but are typically nonlinear at threshold velocities.

It is difficult, almost impossible, to determine from the surface the dynamics of a measurement situation. There are many variables which impact the spinner type flow meters. One variable is changes in the viscosity of the fluid which is in part dependent on pressure and temperature. It is not possible to measure these values easily in a given situation. The present apparatus is directed to a flow measuring device which utilizes a spinner exposed to the fluid flowing in the well, wherein threshold rotations nonlinearities are avoided. This apparatus is able to measure increases in velocity of the well fluid caused by production. Moreover, it can measure flow upwardly of the well or downwardly. It is also able to measure flow across the well should this occur. It utilizes a power supply with a DC motor drive located in a fluid sealed pressure isolated housing. The DC motor is coupled through the housing to an exposed spinner or turbine which is located within a protective cage with a number of openings into the cage so that flow in the well engages the spinner or turbine. The turbine is then rotated by the motor which drives the turbine. The speed of the turbine is altered from the quiescent speed depending on a number of factors. The device can be isolated at a specified depth and then operated for an interval to establish operating conditions of the motor at interval to establish operating conditions of the motor at no flow conditions. For instance, the motor will rotate the turbine at a velocity which is dependent on the viscosity of the surrounding fluid. This assists in furnishing an important calibration point. Indeed, if desired, the well can be packed off so that there is no flow past the test equipment to assure that steady state conditions can be established.

Another important factor is the use of a spinner or turbine structure which is omnidirectional. That is, it is surrounded by a cage which permits upward or downward flow and which also permits transverse flow thereacross, the cage having a number of openings so that flow from any direction may impinge upon the cage and thereby rotate the spinner or turbine. Initial rotation of the spinner in response to the surrounding fluid flow conditions establishes certain currents in the motor drive circuitry which are measured and which are then calibrated with respect to operating conditions so that flow rate can then be determined. Flow rate measurements can be made with the tool traveling upwardly, or downwardly in the well. Moreover, there may be a direction reversal in the spinner. In the preferred embodiment the spinner is coupled magnetically and hence is able to slip or rotate at a different rate of speed compared to the motor. Indeed, it can rotate in the opposite direction. This enables the system to respond in a linear fashion to the dynamics of fluid flow. This is converted into a signal which is used to obtain spinner velocity and is therefore easily represented as flow velocity. With that data established in a situation, it is then easier to calculate volume because it is given by the relatively simple relationship of $Q = KVA$ where K is a constant of proportionality, V is velocity and A is the well bore area. In the foregoing relationship, the area is fixed and thus only velocity is required to determine total volumetric flow Q.

In summary, the present apparatus is a tool adapted to be lowered on a logging cable into a well borehole and further incorporates an enclosed housing which supports a DC motor connected with a rotating magnetic coupling plate. A transverse pressure tight bulkhead enables magnetic coupling through the bulkhead to a similar clutch plate on the opposite side of the bulkhead. That clutch is connected to a shaft to rotate a spinner or turbine. It is surrounded by a cage to protect the turbine with a number of openings or slots formed into the cage permitting mud flow upwardly and downwardly through the cage. The cage may rotate at a different rate than the driving rate provided by the DC motor. Motor voltage, current, speed, direction and polarity are determined and delivered to the surface along the logging cable.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

Figure 5:
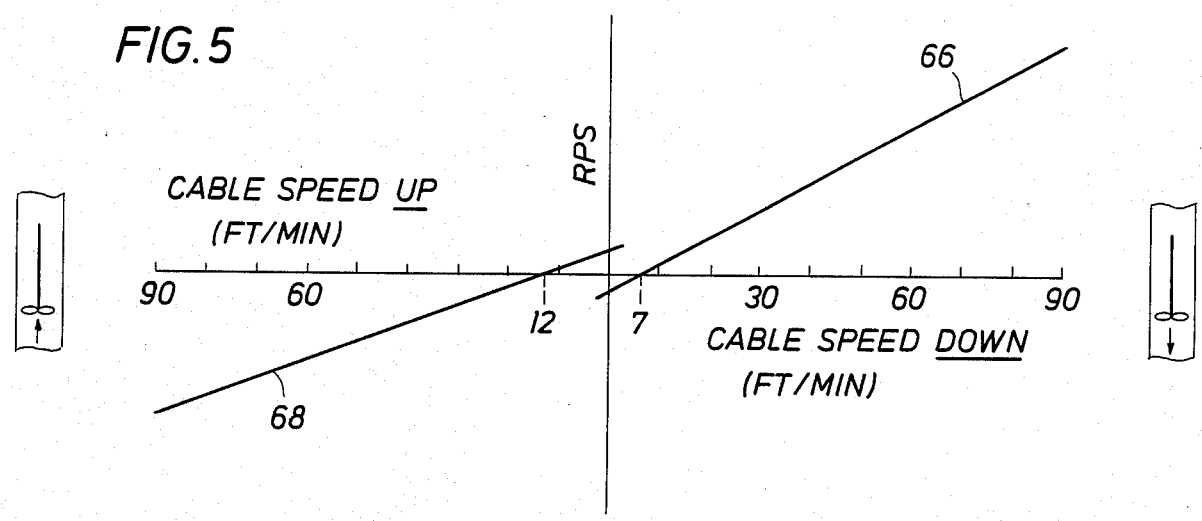
Figure 6:
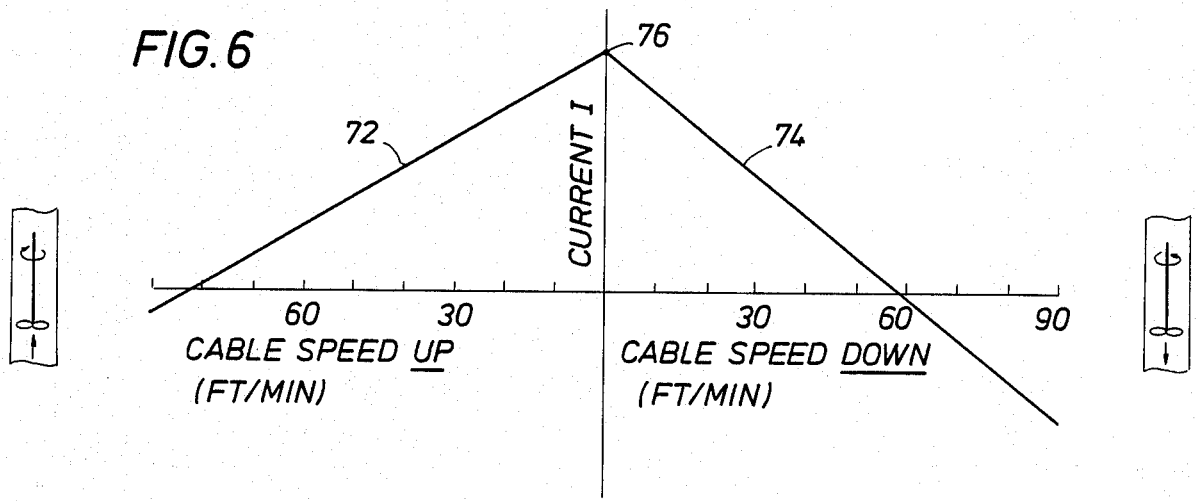
Figure 7:
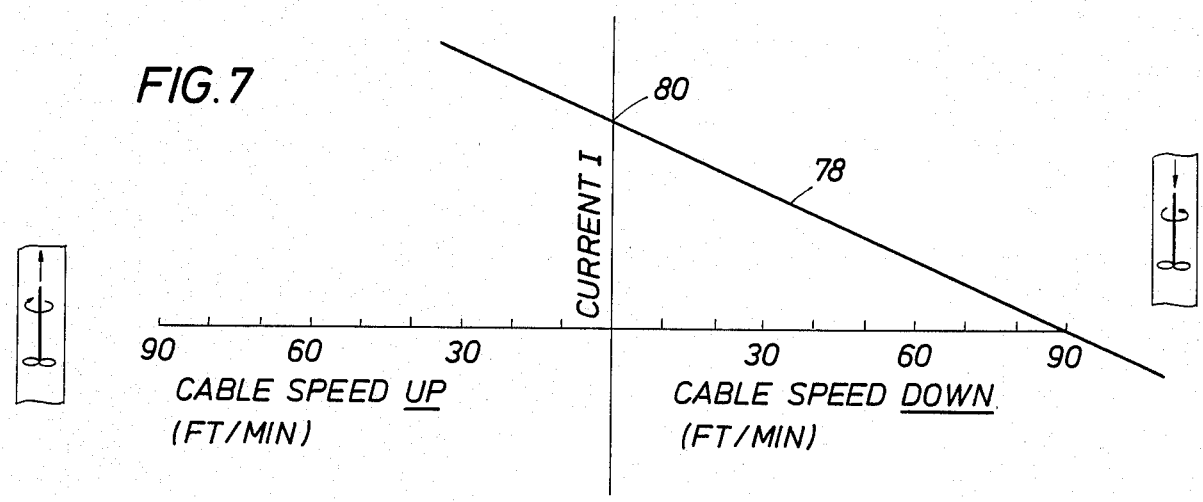

IN THE DRAWINGS:

FIG. 1 is a sectional view through a measuring tool in accordance with the present disclosure illustrating an internal sealed housing enclosing a drive motor, the housing being located above a pressure resistant non-magnetic bulkhead and illustrating a magnetic clutch which couples motion across the bulkhead to rotate a spinner;

FIG. 2 is a sectional view along the line 2—2 showing a magnetic clutch plate;

FIG. 3 is a sectional view along the line 3—3 of FIG. 1 showing details of construction of a rotatable cage shaped turbine;

FIG. 4 is a view of the lower end of the tool which shows fluid flow openings out of the cage;

FIG. 5 is a chart of calibration curves for a typical calibration situation;

FIG. 6 is an alternate chart showing calibration curves for a different situation; and FIG. 7 is another calibration situation represented in short form.

DESCRIPTION OF THE PREFERRED EMBODIMENT

Going now to FIG. 1 of the drawings, the numeral 10 identifies a sonde adapted to be lowered on a logging cable 12 in a well borehole 14. The bore can be open hole, totally cased, partially cased or any other typical situation where fluid flow is to be determined. The well 14 passes through at least one formation 16 which typically provides fluid flow into the well. Other formations may be penetrated by the well 14 where the formations rob fluid flow from the well. Thus, there may be one or more producing formations penetrated by the well and there may be also one or more thief formations deriving fluid from the well. The well can be substantially deep so that the logging cable is able to lower the sonde 10 to any depth including locations above or below the formations of interest. The logging cable passes over a sheave 18 at the well head and is spooled on a reel or drum 20. Signals provided through the logging cable are delivered on one or more conductors along the logging cable and are output to a signal conditioner 22. That provides signals of appropriate format to a computer 24. This converts the signals into measurements as will be exemplified with the various graphs of FIG. 5 and others, and the data which is obtained from these graphs is recorded by a recorder 26. The recorder 26 records measurements as a function of depth and velocity. These measurements are assisted by providing a mechanical or electrical depth measuring apparatus connected to the sheave and input to the recorder 26.

The sonde is constructed with a closed housing 30 which is sealed across the bottom by a transverse non-magnetic bulkhead 32. In the region above the bulkhead, a DC drive motor 34 is enclosed. It drives or rotates one plate 36 of a magnetic clutch. The clutch plate 36 is connected magnetically to a similar clutch plate 38 to be described. As shown in FIG. 2, the clutch plate effectively has a bar magnet formed in it so that there are magnetic poles, the poles enabling magnetic coupling to the other clutch plate. The motor 34 is powered by a power supply 40. The power supply is connected to an analog to digital converter 42 which furnishes certain output signals to conductors in the logging cable 12. Variables from the power supply are provided to the A/D converter 42 and include motor voltage, current, polarity and direction. Motor speed is also measured. These measurements obtained directly from the DC motor are used to determine the inferred speed of rotation of the equipment below the transverse bulkhead. FIG. 1 further illustrates a mounting shaft 44 which supports the second clutch plate 38. This clutch plate is adjacent a sealed bushing 46 which enables the shaft to rotate freely. The shaft supports a rotatable turbine 48. The turbine is shown to have at least a pair of toroidal blades 50. They are supported by the shaft 44. The shaft connects with outwardly extending braces 52 better shown in FIG. 3. The braces position an outer ring connected with the turbine blades. The turbine blades are rotated as fluid flows through the turbine.

The numeral 54 identifies a surrounding housing about the turbine 48. The housing 54 is provided with several perforations at 56. The perforations are placed at strategic locations so that fluid flow is directed into the housing and passes through the turbine. There are many holes in the housing 54 below the bulkhead 32. The multiple holes enable fluid flow paths to be defined through the region of the turbine so that the fluid impinges on the turbine blades 50 and the turbine is then rotated. Moreover, the turbine is engaged with the fluid flow so that rotation is assured.

FIG. 4 shows the very bottom end of the housing 54 where a multitude of slots 58 complete the fluid flow pathway. If the pathway is from above to below the tool, the slots 58 provide the exit point for the fluid flow. On the other hand, if the fluid flow is upwardly along the well borehole and passes through the housing 54, such flow is directed into the slots 58, then engages the turbine 48 and exits through the perforations 56 shown in FIG. 3. The apparatus further includes a sealed bearing assembly 60 at the lower end of the housing.

Stationary operation of the device will first be described. Assume for purposes of description that the sonde has been lowered to a specified depth in a well. Assume further that there is no flow. This can be obtained by packing off the well by means of a packer 64. The packer prevents fluid flow upwardly and downwardly. By suitable control signals, the DC motor is switched on and is driven at a specified speed. After steady state conditions have been established, measurements can then be taken of motor operation. They will indicate a degree of arises between the turbine 48 and the well fluid which surrounds the turbine 48. If the fluid is heavy drilling mud, the data will indicate this in view of the fact that the mud is quite viscous and retards turbine rotation. If the fluid is natural gas, the drag on the turbine will be markedly less. Mixtures of oil and water will provide intermediate values.

In the foregoing, the drag is a function of pressure and temperature which impact the viscosity of the surrounding fluid. These are important variables which can be determined by observing the data from the motor. The motor data can be calibrated so that rotation of the turbine 48 in natural gas provides a specific data point. Rotation in different weights of drilling mud will provide additional data points. By this approach, the viscosity can be determined from data from the power supply 40.

In another situation, it is desirable to raise or lower the sonde 10 at a specified velocity in the well. This is exemplified in FIG. 5 of the drawings. In FIG. 5 sonde movement upwardly is shown to the left of the origin while the right side is downward movement. The ordinate is spinner speed which is represented in RPS or revolutions per second. If the sonde is raised and lowered in a given region in the well, then the velocity of the fluid at that region of the well can be determined. In FIG. 5, the curve 66 identifies data taken at different downward cable speeds which are recorded in feet per minute. For instance, in the same well region, measurements are taken at 30, 60 and 90 feet per minute. Data points from the relatively high velocities define the the curve 66 is extended to obtain the required intercept. In this particular example, the intercept is at 7 feet per minute. In similar fashion, the sonde is raised so that measurements are taken at 30, 60 and 90 feet per minute in the upward direction to obtain the curve 68. This curve is also extended to obtain the necessary intercept and in this instance, it shows an intercept at 12 feet per minute. Intercepts of 7 and 12 feet per minute provide an average of 9.5 feet per minute which is the threshold velocity for the spinner. flow rates with veolicites less than this value can not be measured with conventional spinner tools. Fluid velocities slightly greater than this threshold velocity can not be measured accurately because of the nonlinear performance of the measuring equipment. When the turbine slows down because the flow rate is slow, it becomes nonlinear because of small, even minute drag factors. In this instance, all measurements have been taken at relatively high tool velocities and hence relatively high values of rps. Thus, the two curves 66 and 68 are obtained primarily from measurements which are substantially away from threshold operating conditions and the difference in the intercepts is the threshold velocity. FIG. 5 thus shows one approach to obtaining a measurement of fluid flow in the well avoiding transducer nonlinearity. In summary, low speed operating conditions of the equipment are avoided.

Going now to FIG. 6 of the drawings, another set of curves is obtained. Again, the calibration is based on cable speed up and down the well. In this instance, the DC motor polarity is reversed so that the turbine is ordinarily driven in the opposite direction. Here, the ordinate is calibrated in terms of motor current. Thus, a first curve is obtained at 72 while a second curve is obtained by measurements and is indicated at 74. The curve 72 is derived from data points indicative of moving the sonde upwardly in the well. The data points are plotted and extrapolated to the intercept at 76. The curve 74 is obtained by moving the tool downwardly in the borehole typically at velocities of 30, 60 and 90 feet per minute. Again, data points are obtained and the curve 74 is plotted. The curve 74 extends to the intercept 76 so that both curves provide a certain and sure indication of motor current at zero fluid movement. Current can be calibrated to determine fluid flow velocity in the well.

Another set of data is represented in FIG. 7. Here, measurements are taken with the tool moving upwardly and downwardly in the well borehole. The motor is not reversed. The data points show how the curve 78 obtains the intercept at 80 wherein current is known, and fluid flow velocity can therein be inferred. In similar fashion to the other curves, FIG. 7 shows how measurements are taken by moving the tool at various speeds upwardly and downwardly in the well. In this instance, no variations are made in polarity so that the curve has the form of a straight line segment as compared with two straight line segments shown in FIG. 6.

Such velocity measurements as represented in FIGS. 5, 6 and 7 are taken in a given region of the well. This can be the region just above the formation 16 shown in FIG. 1. Similar measurements like this are taken in the region below the formation 16. They may show a different fluid flow velocity. If so, that means that the formation 16 is introducing fluid into the well, or perhaps removing fluid. Examination of the velocity measurements will determine flow volumes and thereby indicate fluid production (or removal) from the formation 16. If the well penetrates ten zones of interest then eleven flow rates are needed, each being measured above or below the ten zones of interest. The change in flow rates can then be evaluated for each zone to determine subsequent well treatment.

While the foregoing is directed to the preferred embodiment, the scope is determined by the claims which follow.

What is claimed is:

1. A method of measuring flow velocity in a well which comprises the steps of:
   (a) positioning a motor driven turbine means in a well and exposed to fluid flow along the well so that the fluid impinges on the turbine means and flow thereof tends to rotate the turbine means dependent on the direction and velocity of flow;
   (b) driving the turbine means with a motor at a first rate of rotation;
   (c) exposing the turbine means to the fluid flow so that the rate of rotation is modified from the first rate to a second rate dependent on flow velocity; and
   (d) measuring the change occurring in motor operation with a change from the first to the second rate of rotation wherein the change is related to the flow velocity of fluid in the well.

2. The method of claim 1 including the step of magnetically coupling the motor to the turbine means through a magnetic clutch means wherein clutch slippage may occur and such slippage is reflected as a change in motor current during operation.

3. The method of claim 1 including the step of positioning a surrounding perforated cage about the turbine means to thereby enable multidirectional fluid flow through said cage.

4. The method of claim 1 including the step of isolating the motor in a fluid tight sealed housing terminating at a nonmagnetic transverse bulkhead and positioning first and second cooperative plates of a magnetic clutch on opposite sides of the housing to couple magnetic movement through the nonmagnetic bulkhead for rotating the turbine means at an exposed location on the exterior of the sealed housing.

5. The method of claim 1 including the step of operating the apparatus by moving upwardly and downwardly in the well in a given region to obtain measurements therefrom during upward and downward travel and wherein the first rate of rotation of the turbine is a non zero value.

6. The method of claim 1 including the step of operating the motor to continuously couple the motor to the turbine means wherein variations in valves rotation are coupled to motor operating.

7. The method of claim 1 wherein the turbine means is powered by a motor and provides a variable load on the motor and including the step of moving the turbine means at selected non-zero speeds in the well and measuring the load on the motor.

8. The method of claim 1 including the steps of determining motor load at a speed of zero using motor load data at the selected speeds.

9. The method of claim 8 including the step of plotting speed versus motor load data at the selected speeds and extending such plotted data to the zero speed intercept.

10. Apparatus for measuring fluid flow velocity in a well, comprising:
   (a) an elongate sonde sized and adapted for passage in a well borehole;
   (b) turbine means carried by said sonde and exposed to fluid flow in the well borehole;
   (c) housing means surrounding said turbine means and having a plurality of openings therein to admit fluid flow in the well to the vicinity of said turbine means to rotate the turbine;
   (d) a sealed housing in said sonde;
   (e) motor means in said housing; and
   (f) magnetic clutch means connected to said motor means and said turbine means externally of said sealed housing, wherein said clutch means provides power to said turbine means while permitting slippage and rotating said turbine means at a speed depending on resistance to turbine means rotation.

* * * * *